(12) United States Patent
Ozeki et al.

(10) Patent No.: US 11,340,171 B2
(45) Date of Patent: May 24, 2022

(54) STIMULATED RAMAN SCATTERING MICROSCOPE DEVICE AND STIMULATED RAMAN SCATTERING MEASUREMENT METHOD

(71) Applicant: THE UNIVERSITY OF TOKYO, Tokyo (JP)

(72) Inventors: Yasuyuki Ozeki, Tokyo (JP); Yuta Suzuki, Tokyo (JP); Yoshifumi Wakisaka, Tokyo (JP); Keisuke Goda, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 307 days.

(21) Appl. No.: 16/076,389

(22) PCT Filed: Feb. 9, 2017

(86) PCT No.: PCT/JP2017/004728
§ 371 (c)(1),
(2) Date: Dec. 28, 2018

(87) PCT Pub. No.: WO2017/138606
PCT Pub. Date: Aug. 17, 2017

(65) Prior Publication Data
US 2019/0137401 A1 May 9, 2019

(30) Foreign Application Priority Data
Feb. 9, 2016 (JP) .............................. JP2016-022615

(51) Int. Cl.
*G01N 21/65* (2006.01)
*G01J 3/02* (2006.01)
(Continued)

(52) U.S. Cl.
CPC ............ *G01N 21/65* (2013.01); *G01J 3/0208* (2013.01); *G01J 3/0218* (2013.01); *G01J 3/0264* (2013.01);
(Continued)

(58) Field of Classification Search
CPC .......... G01J 2003/102; G01J 2003/106; G01J 2003/283; G01J 3/10; G01J 3/28;
(Continued)

(56) References Cited

U.S. PATENT DOCUMENTS 6,151,522 A    11/2000   Alfano et al.
7,352,458 B2 *   4/2008   Xie .......................... G01J 3/433
                                                   356/301

(Continued)

FOREIGN PATENT DOCUMENTS

JP    2013-113623 A    6/2013
JP    2014-173973 A    9/2014
(Continued)

OTHER PUBLICATIONS

Pascal Berto et al: "Background-Free Stimulated Raman Spectroscopy and Microscopy", Physical Review Letters, vol. 112, No. 5, Feb. 1, 2014 (Feb. 1, 2017), XP055118478, ISSN: 0031-9007, DOI: 10.1103/PhysRevLett.112.053905.

(Continued)

*Primary Examiner* — Violeta A Prieto
(74) *Attorney, Agent, or Firm* — Oliff PLC

(57) ABSTRACT

A stimulated Raman scattering microscope device is configured to irradiates a sample with a first optical pulse at a first repetition frequency, to irradiate the sample with a second optical pulse of an optical frequency different from an optical frequency of the first optical pulse at a second repetition frequency, and to detect optical pulses of the first repetition frequency that are included in detected light from (Continued)

the sample irradiated with the first optical pulse and the second optical pulse, as a detected optical pulse train. The second optical pulse is generated by dispersing predetermined optical pulses that include lights of a plurality of optical frequencies, regulating to output optical pulses of a predetermined number of different optical frequencies out of the dispersed optical pulses at the second repetition frequency, and coupling the regulated optical pulses.

10 Claims, 9 Drawing Sheets

(51) Int. Cl.
  *G01J 3/10*  (2006.01)
  *G01J 3/28*  (2006.01)
  *G01J 3/44*  (2006.01)
  *G02B 21/06*  (2006.01)
  *G01N 21/85*  (2006.01)

(52) U.S. Cl.
  CPC . *G01J 3/10* (2013.01); *G01J 3/28* (2013.01); *G01J 3/44* (2013.01); *G02B 21/06* (2013.01); *G01J 2003/102* (2013.01); *G01J 2003/106* (2013.01); *G01J 2003/283* (2013.01); *G01N 21/85* (2013.01); *G01N 2021/655* (2013.01); *G01N 2021/8592* (2013.01); *G01N 2201/061* (2013.01); *G01N 2201/063* (2013.01)

(58) Field of Classification Search
  CPC . G01J 3/44; G01N 15/1434; G01N 2015/144; G01N 2201/061; G01N 2201/063; G01N 2021/655; G01N 2021/653–656; G02B 21/06

See application file for complete search history.

(56) References Cited

U.S. PATENT DOCUMENTS

| | | | |
|---|---|---|---|
| 2007/0091305 A1* | 4/2007 | Xie | G01N 21/65 356/301 |
| 2012/0140217 A1* | 6/2012 | Ozeki | G01N 21/65 356/301 |
| 2013/0135615 A1* | 5/2013 | Ozeki | G01N 21/65 356/301 |
| 2014/0043606 A1* | 2/2014 | Ozeki | G01N 21/65 356/301 |
| 2014/0104608 A1* | 4/2014 | Ozeki | G01N 21/65 356/301 |
| 2014/0132955 A1* | 5/2014 | Kawano | G01N 21/65 356/301 |
| 2014/0253918 A1 | 9/2014 | Ozeki et al. | |
| 2015/0204790 A1 | 7/2015 | Yonetani | |
| 2016/0047750 A1 | 2/2016 | Berto et al. | |
| 2016/0103072 A1* | 4/2016 | Fukutake | C12M 21/08 435/29 |
| 2018/0283939 A1* | 10/2018 | Krishnamachari | G01J 3/027 |

FOREIGN PATENT DOCUMENTS

| | | |
|---|---|---|
| JP | 2015-062026 A | 4/2015 |
| JP | 2015-158482 A | 9/2015 |
| WO | 2014/154708 A1 | 10/2014 |
| WO | 2015/145429 A1 | 10/2015 |

OTHER PUBLICATIONS

Yasuyuki Ozeki "Biological Imaging Based on Stimulated Raman Scattering;" Biophysics vol. 54, No. 6 p. 311-314, 2014, Only abstract reviewed.
Koya Kobayashi "High-speed multicolor stimulated Raman scattering microscopy by fast wavelength switching;" Proceedings of the 77th Application Physics Society Fall Scientific Lecture, Sep. 1, 2016, 15a-P1-7 with English Abstract, Only abstract reviewed.

* cited by examiner

STIMULATED RAMAN SCATTERING MICROSCOPE DEVICE AND STIMULATED RAMAN SCATTERING MEASUREMENT METHOD

This is a national phase application of PCT/JP2017/004728 filed on Feb. 9, 2017, claiming priority to Japanese Patent Application No. JP2016-022615 filed on Feb. 9, 2016, the contents of which are incorporated herein by reference.

TECHNICAL FIELD

The present disclosure relates to a stimulated Raman scattering microscope device and stimulated Raman scattering measurement method.

BACKGROUND

With a view to improving the discrimination power of a sample, a proposed configuration of a stimulated Raman scattering microscope device makes the optical frequency of a first light or a second light variable, so as to not only detect molecular vibration using only a specific optical frequency but detect molecular vibration in a wide frequency range (as described in, for example, Patent Literature 1). This device makes the optical frequency of the first light by driving at least one element, out of a dispersive element that separates an incident light into lights in different directions according to optical frequencies and an optical element included in a light guiding optical system that guides light from a first light source to the dispersive element, to change the angle of incidence of the incident light to the dispersive element and extracting part of the lights separated in the different directions.

A proposed high-speed stimulated Raman scattering spectromicroscope employs Yb (ytterbium) fiber laser technology to change the optical frequency in ±15 nm about 1030 nm at the center in a time of approximately 1 millisecond (as described in, for example, Non-Patent Literature 1). This microscope sequentially performs imaging with changing 30 molecular vibrational frequencies per second over a range of 300 cm$^{-1}$. This microscope completes imaging only in 3 seconds even for 90 spectral points.

CITATION LIST

Patent Literature

PTL 1: JP 2015-062026A

Non-Patent Literature

"Bioimaging by Stimulated Raman Scattering" Yasuyuki Ozeki, Biophysics Vol. 54, No. 6, p 311-p 314, 2014

SUMMARY

The stimulated Raman scattering microscope device described above, however, has a low changeover speed of the optical frequency and a low scanning rate and thereby fails to provide accurate imaging of an object when the object flows or the object moves during imaging, for example, in the case of imaging an object that is present in a high speed flow and has the low appearance probability or in the case of imaging a moving object such as euglena.

A stimulated Raman scattering microscope device and a stimulated Raman scattering measurement method of the present disclosure mainly aim to provide quicker imaging of an object.

In order to achieve the above primary aim, the stimulated Raman scattering microscope device and stimulated Raman scattering measurement method of the present disclosure employs the following configuration.

The present disclosure is directed to a stimulated Raman scattering microscope device. The stimulated Raman scattering microscope device includes a first optical pulse generator configured to output a first optical pulse of a predetermined optical frequency at a first repetition frequency, a second optical pulse generator configured to output a second optical pulse of an optical frequency different from the predetermined optical frequency of the first optical pulse at a second repetition frequency that provides the first repetition frequency by integral multiplication and a photodetector configured to detect the intensity of optical pulses of the predetermined optical frequency at the first repetition frequency that are included in transmitted light and/or scattered light from a sample irradiated with the first optical pulse in synchronism with the second optical pulse. The second optical pulse generator includes a light source unit configured to output predetermined optical pulses including lights of a plurality of optical frequencies, an optical regulator configured to disperse the optical pulses and output a predetermined number of the dispersed optical pulses at different optical frequencies, at the second repetition frequency, and an optical coupler configured to couple the optical pulses from the optical regulator.

The stimulated Raman scattering microscope device of this aspect irradiates the sample with the first optical pulse of the predetermined optical frequency that is output from the first optical pulse generator at the first repetition frequency, in synchronism with the second optical pulse of the optical frequency different from the predetermined optical frequency of the first optical pulse output from the second optical pulse generator at the second repetition frequency that provides the first repetition frequency by integral multiplication. The stimulated Raman scattering microscope device then detects the intensity of optical pulses of the predetermined optical frequency at the first repetition frequency that are included in the transmitted light or the scattered light from the sample. When molecules having a molecular vibrational frequency that is equal to the difference between the optical frequency of the first optical pulse and the optical frequency of the second optical pulse are present at an irradiation point of the first optical pulse and the second optical pulse, stimulated Raman scattering causes amplification or attenuation in the intensity of the first optical pulse and also causes attenuation or amplification in the intensity of the second optical pulse. Accordingly, a change in intensity of the optical pulses included in a detected optical pulse train (optical pulses of the predetermined optical frequency at the first repetition frequency) indicates the presence of molecules having a molecular vibrational frequency that is equal to the difference between the optical frequency of the first optical pulse and the optical frequency of the second optical pulse, at the irradiation point. In the stimulated Raman scattering microscope device of this aspect, the second optical pulse generator disperses the predetermined optical pulses including the lights of the plurality of optical frequencies output from the light source unit and outputs the optical pulses of the predetermined number of different optical frequencies out of the dispersed optical pulses, at the second repetition frequency. The second optical pulse generator then couples the optical pulses output at the second repetition frequency and outputs the coupled optical pulses as the second optical pulse. Assuming that the predetermined number is equal to an integral number M, "the optical pulses of the predetermined number of different optical frequencies" are optical pulses of M different optical frequencies ω1 to ωm. The second optical pulse generator accordingly outputs a pulse train of M optical pulses having sequentially changing optical frequencies ω1 to ωm, at the second repetition frequency.

As described above, the stimulated Raman scattering microscope device of the above aspect disperses the predetermined optical pulses output from the light source unit and outputs the optical pulses of the predetermined number of different optical frequencies out of the dispersed optical pulses, at the second repetition frequency. This configuration accordingly enables the optical frequency to be changed in every optical pulse. Additionally, this configuration sequentially outputs the optical pulses of the predetermined number of different optical frequencies and needs only irradiation of one irradiation point with the predetermined number of optical pulses. This configuration ensures the quicker scanning, compared with a configuration that changes the optical frequency by every fractional frequency. As a result, this configuration allows for accurate imaging even in the case of detecting an object that is present in a high speed fluid and has a low appearance probability or in the case of detecting a moving object. The "predetermined number of different optical frequencies" are optical frequencies required for identification of an object included in a sample and are preferably a plurality of optical frequencies providing a spectral change of the first optical pulse that is approximate to a spectral change of the first optical pulse by stimulated Raman scattering when the optical frequency is changed by every fractional frequency. With regard to amplification or attenuation of the intensity of the optical pulses by stimulated Raman scattering, the higher optical frequency of the first optical pulse than the optical frequency of the second optical pulse causes attenuation in the intensity of the first optical pulse and causes amplification in the intensity of the second optical pulse. The lower optical frequency of the first optical pulse than the optical frequency of the second optical pulse, on the contrary, causes amplification in the intensity of the first optical pulse and causes attenuation in the intensity of the second optical pulse.

In the stimulated Raman scattering microscope device of this aspect, the light source unit may include a light source configured to output the predetermined optical pulses at a repetition frequency that provides the second repetition frequency by multiplication of the predetermined number. In the stimulated Raman scattering microscope device of this aspect, the second optical pulse generator outputs an optical pulse train including the predetermined number of optical pulses, at the second repetition frequency.

In the stimulated Raman scattering microscope device of another aspect, the light source unit may be a light source unit configured to output a predetermined optical pulse train, which includes a predetermined consecutive number of the predetermined optical pulses of the second repetition frequency, at a repetition frequency that provides the second repetition frequency by multiplication of the predetermined number by the predetermined consecutive number. Assuming that the predetermined consecutive number is equal to an integral number N, a predetermined optical pulse train including N consecutive predetermined optical pulses is output at a frequency by dividing the second repetition frequency by a value of (N×predetermined number). In this case, assuming that the predetermined number is equal to an integral number M, the second optical pulse generator outputs a pulse train including N optical pulses of an optical frequency ω1, N optical pulses of an optical frequency ω2, . . . , and N optical pulses of an optical frequency ωm. Accordingly, the second optical pulse generator outputs the predetermined consecutive number of optical pulses of the predetermined number of optical frequencies at the second repetition frequency. In the stimulated Raman scattering microscope device in such aspects, the light source unit may include a light source configured to output the predetermined optical pulses at the second repetition frequency and an optical intensity modulator configured to make intensity of remaining optical pulses equal to a value 0, such that the predetermined optical pulse train is output at the repetition frequency that provides the second repetition frequency by multiplication of the predetermined number by the predetermined consecutive number, from an optical pulse train including the predetermined optical pulses of the second repetition frequency from the light source.

In the stimulated Raman scattering microscope device of another aspect, the second optical pulse generator may include an optical amplifier configured to amplify intensity of an optical pulse from the optical coupler and output the optical pulse of the amplified intensity. This configuration increases the intensity of the second optical pulse that is decreased by spectral dispersion and enhances amplification or attenuation of the first optical pulse by stimulated Raman scattering.

In the stimulated Raman scattering microscope device of another aspect may further include a filter processor configured to process a detection signal from the photodetector by a low-pass filter that has a cutoff frequency equal to a frequency of ½ of the second repetition frequency, a high-pass filter that has a cutoff frequency equal to a frequency of ⅕ to ¹⁄₁₀ of the second repetition frequency, and a notch filter that has at least the first repetition frequency and an intensity modulation measurement unit configured to digitize an output from the filter processor at a predetermined sampling period and measure an intensity modulation. Amplification or attenuation of the first optical pulse by stimulated Raman scattering is about ¹⁄₂₀₀₀ to ¹⁄₁₀₀₀₀ of the first optical pulse without amplification or attenuation. This indicates an extremely small intensity modulation by stimulated Raman scattering in a detected optical pulse train. Processing the intensity modulation by stimulated Raman scattering in the detected optical pulse train by the low-pass filter and the high-pass filter described above enables a high frequency component and a low frequency component of the intensity modulation to be removed more appropriately. Additionally, using the notch filter that removes the first repetition frequency that is the repetition frequency of the first optical pulse further enhances the intensity modulation by stimulated Raman scattering in the detected optical pulse train.

The present disclosure is also directed to a stimulated Raman scattering measurement method that irradiates a sample with a first optical pulse of a predetermined optical frequency at a first repetition frequency, irradiates the sample with a second optical pulse of an optical frequency different from the predetermined optical frequency of the first optical pulse at a second repetition frequency that provides the first repetition frequency by integral multiplication, in synchronism with the first optical pulse, and detects optical pulses of the predetermined optical frequency at the first repetition frequency that are included in transmitted light and/or scattered light from the sample irradiated with the first optical pulse and the second optical pulse, as a detected optical pulse train. The stimulated Raman scattering measurement method generates the second optical pulse by dispersing predetermined optical pulses that include lights of a plurality of optical frequencies, regulates to output optical pulses of a predetermined number of different optical frequencies out of the dispersed optical pulses at the second repetition frequency, and couples the regulated optical pulses.

The stimulated Raman scattering measurement method of this aspect irradiates the sample with the first optical pulse of the predetermined optical frequency at the first repetition frequency, in synchronism with the second optical pulse of the optical frequency different from the predetermined optical frequency of the first optical pulse at the second repetition frequency that provides the first repetition frequency by integral multiplication. The stimulated Raman scattering measurement method then detects the optical pulses of the predetermined optical frequency at the first repetition frequency that are included in the transmitted light or the scattered light from the sample, as a detected optical pulse train. When molecules having a molecular vibrational frequency that is equal to the difference between the optical frequency of the first optical pulse and the optical frequency of the second optical pulse is present at an irradiation point of the first optical pulse and the second optical pulse, stimulated Raman scattering causes amplification or attenuation in the intensity of the first optical pulse and also causes attenuation or amplification in the intensity of the second optical pulse. Accordingly, amplification or attenuation of the optical pulses included in the detected optical pulse train (optical pulses of the predetermined optical frequency at the first repetition frequency) indicates the presence of the molecules having a molecular vibrational frequency that is equal to the difference between the optical frequency of the first optical pulse and the optical frequency of the second optical pulse, at the irradiation point. The stimulated Raman scattering measurement method of this aspect generates the second optical pulse by dispersing the predetermined optical pulses including the optical pulses of the plurality of optical frequencies, regulating to output the optical pulses of the predetermined number of different optical frequencies out of the dispersed optical pulses, at the second repetition frequency, and coupling the regulated optical pulses. Assuming that the predetermined number is equal to an integral number M, the "optical pulses of the predetermined number of different optical frequencies" are optical pulses of M different optical frequencies $\omega 1$ to $\omega m$.

As described above, the stimulated Raman scattering measurement method of the above aspect disperses the predetermined optical pulses and outputs the optical pulses of the predetermined number of different optical frequencies out of the dispersed optical pulses, at the second repetition frequency. This configuration accordingly enables the optical frequency to be changed in every optical pulse. Additionally, this configuration sequentially outputs the optical pulses of the predetermined number of different optical frequencies and needs only irradiation of one irradiation point with the predetermined number of optical pulses. This configuration ensures the quicker scanning, compared with a configuration that changes the optical frequency by every fractional frequency. As a result, this configuration allows for accurate imaging even in the case of detecting an object that is present in a high speed fluid and has a low appearance probability or in the case of detecting a moving object. The "predetermined number" used may be the number of different types of molecules required for identification of an object among molecules included in the object. The "optical pulses of the predetermined number of different optical frequencies" may use molecular vibrational frequencies of the number of different types of molecules required for identification of the object.

In the stimulated Raman scattering microscope device of the present disclosure, the optical regulator may comprise an optical splitter/extractor configured to disperse the predetermined optical pulses by using a diffraction grating and take out optical pulses of a predetermined number of different optical frequencies out of the dispersed optical pulses; and a pulse output time regulator including a plurality of optical fibers that have lengths adjusted such that optical pulses are output at the second repetition frequency when the optical pulses of the predetermined number of different optical frequencies are input at an identical timing. In this aspect, the light source unit may comprise a light source configured to output the predetermined optical pulses at a repetition frequency that provides the second repetition frequency by multiplication of the predetermined number. In the stimulated Raman scattering microscope device of this aspect, the pulse output time regulator may regulate the lengths of the plurality of optical fibers, such that an optical pulse train including an optical pulse having intensity of a value 0 in addition to a train of optical pulses of the second repetition frequency is sequentially output. Assuming that the predetermined number is equal to an integral number M, an optical pulse train including an optical pulse having the intensity of the value 0 in addition to a train of M optical pulses having sequentially changing optical frequencies $\omega 1$ to $\omega m$ is output at the second repetition frequency. More specifically, the optical pulse train includes an optical pulse of an optical frequency $\omega 1$, an optical pulse of an optical frequency $\omega 2$, . . . , an optical pulse of an optical frequency $\omega m$, and an optical pulse having the intensity of the value 0. The optical pulse having the intensity of the value 0 is synonymous with the presence of no optical pulse. Accordingly, no stimulated Raman scattering occurs in the first optical pulse radiated in synchronism with the optical pulse having the intensity of the value 0, so that the detected optical pulses have neither amplification nor attenuation. Including the optical pulse having the intensity of the value 0 in the optical pulse train allows for detection of optical pulses that have no periodic amplification nor attenuation by stimulated Raman scattering. Such optical pulses may be used as the criterion of amplification or attenuation with respect to optical pulses having amplification or attenuation by stimulated Raman scattering.

In the stimulated Raman scattering microscope device of the present disclosure, the optical regulator may comprise an optical splitter/extractor configured to disperse the predetermined optical pulses by using a diffraction grating and take out optical pulses of a predetermined number of different optical frequencies out of the dispersed optical pulses; and optical intensity modulators configured to modulate optical pulse trains including optical pulses of a predetermined number of different optical frequencies and output optical pulse trains having different patterns of remaining optical pulses by disappearance of part of the optical pulses in the optical pulse train. For example, the optical splitter/extractor takes out optical pulse trains including eight optical pulses of four optical frequencies $\omega 1$ to $\omega 4$. The optical intensity modulators output optical pulse trains of the following patterns. With regard to an optical pulse train of an optical frequency $\omega 1$, two optical pulses, i.e., first and second optical pulses are output with keeping their intensities unchanged, and the remaining six optical pulses completely disappear. With regard to an optical pulse train of an optical frequency ω2, two optical pulses, i.e., third and fourth optical pulses are output with keeping their intensities unchanged, and the remaining six optical pulses completely disappear. With regard to an optical pulse train of an optical frequency ω3, two optical pulses, i.e., fifth and sixth optical pulses are output with keeping their intensities unchanged, and the remaining six optical pulses completely disappear. With regard to an optical pulse train of an optical frequency ω4, two optical pulses, i.e., seventh and eighth optical pulses are output with keeping their intensities unchanged, and the remaining six optical pulses completely disappear. The optical intensity modulators accordingly modulate four optical pulse trains including eight optical pulses of four optical frequencies ω1 to ω4 from the optical splitter/extractor and outputs four optical pulse trains of eight optical pulses including two optical pulses of the four optical frequencies ω1 to ω4 and six disappearing pulses. Coupling these optical pulse trains by the coupler causes an optical pulse train of eight optical pulses including two optical pulses of the optical frequency ω1, two optical pulses of the optical frequency ω2, two optical pulses of the optical frequency ω3 and two optical pulses of the optical frequency ω4, which are arranged sequentially to be output as the second optical pulse from the second optical pulse generator. This configuration changes the pattern of remaining optical pulses by disappearance of part of the optical pulses in the optical pulse train in the optical intensity modulator and thereby generates the second optical pulse, as various optical pulse trains including optical pulses of a desired number of optical frequencies.

In the stimulated Raman scattering microscope device of the present disclosure, the optical regulator may comprise an optical splitter configured to split optical pulses into M optical pulses; frequency regulators configured to output optical pulses of M different optical frequencies from the M optical pulses; and optical intensity modulators configured to modulate optical pulse trains including the optical pulses of the M different optical frequencies and output optical pulse trains having different patterns of remaining optical pulses by disappearance of part of the optical pulses in the optical pulse trains. Like the stimulated Raman scattering microscope device of the above configuration equipped with an optical splitter/extractor, this configuration changes the pattern of remaining optical pulses by disappearance of part of the optical pulses in the optical pulse trains in the optical intensity modulators and thereby generates the second optical pulse, as various optical pulse trains including optical pulses of a desired number of optical frequencies.

DESCRIPTION OF EMBODIMENTS

The following describes some aspects of the disclosure with reference to embodiments.

Figure 1:
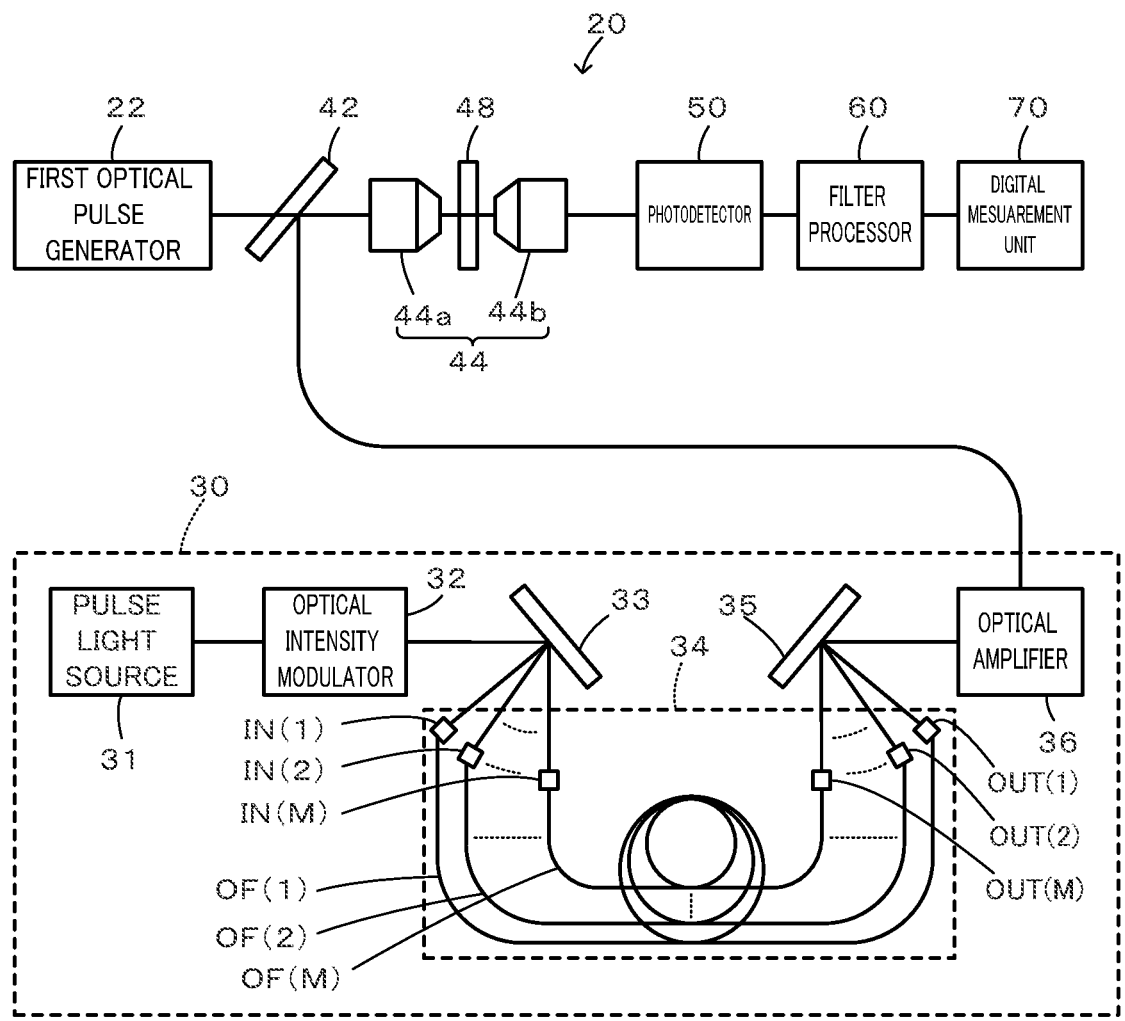
FIG. 1 is a configuration diagram illustrating the schematic configuration of a stimulated Raman scattering microscope device according to an embodiment of the present disclosure.

FIG. 1 is a configuration diagram illustrating the schematic configuration of a stimulated Raman scattering microscope device 20 according to an embodiment of the present disclosure. As illustrated, the stimulated Raman scattering microscope device 20 of the embodiment includes a first optical pulse generator 22; a second optical pulse generator 30; a dichroic mirror 42 configured to couple first optical pulses with second optical pulses; an optical system 44 comprised of a radiation-side optical system. 44a including lenses provided on a light radiation side of a sample 48 and a transmission scattering-side optical system 44b including lenses provided on a light transmission side and a light scattering side of the sample 48; a photodetector 50 configured to detect the intensities of optical pulses having an identical optical frequency with that of first optical pulses of the transmitted light or the scattered light of the sample 48; a filter processor 60 configured to process signals from the photodetector 50 by a filtering process; and a digital measurement unit 70 configured to digitize signals from the filter processor 60 at a predetermined sampling frequency.

The first optical pulse generator 22 serves as a short pulse light source configured to output first optical pulses (excitation light) having an optical frequency regulated in advance and having a pulse width of several picoseconds, at a first repetition frequency. A known short pulse light source may be employed for the first optical pulse generator 22. A short pulse light source having a first repetition frequency of 76 MHz is used according to the embodiment.

The second optical pulse generator 30 includes a pulse light source 31 configured to output optical pulses; an optical intensity modulator 32 configured to regulate the intensities of optical pulses; a diffraction grating 33 configured to disperse the optical pulses from the optical intensity modulator 32 into optical pulses of M different optical frequencies; a pulse output time adjuster 34 configured to adjust the output times of the optical pulses of the M different optical frequencies by means of M optical fibers OF(1) to OF(M); a diffraction grating 35 configured to couple the optical pulses of the M different optical frequencies from the pulse output time adjuster 34; and an optical amplifier 36 configured to amplify the intensities of the optical pulses from the diffraction grating 35.

The pulse light source 31 serves as a short pulse light source configured to output optical pulses (for example, optical pulses of broadband light) having a pulse width identical with the pulse width of the first optical pulses and including a plurality of different optical frequencies that are lower than the optical frequency of the first optical pulses, at a second repetition frequency that provides the repetition frequency of the first optical pulses (first repetition frequency) by integral multiplication. For example, a light source identical with the short pulse light source used for the first optical pulse generator 22 may be employed for the pulse light source 31.

The optical intensity modulator 32 has a known configuration to modulate the intensities of optical pulses and is used to make modulation such that an optical pulse is output with keeping the intensity unchanged or an optical pulse completely disappears according to the embodiment.

The pulse output time adjuster 34 is comprised of the M optical fibers OF(1) to OF(M) that cause optical pulses of predetermined M different optical frequencies among the optical pulses dispersed by the diffraction grating 33 to be received by light receiving portions IN(1) to IN(M) and to be output from output portions OUT(1) to OUT(M) on the other end. The lengths of the optical fibers OF(1) to OF(M) are adjusted such that simultaneously input optical pulses of M different frequencies are sequentially output at the second repetition frequency.

The optical amplifier 36 amplifies the intensities of the optical pulses of the M different frequencies that are sequentially output at the second repetition frequency, and a known optical amplifier may be employed for the optical amplifier 36.

Figure 2:
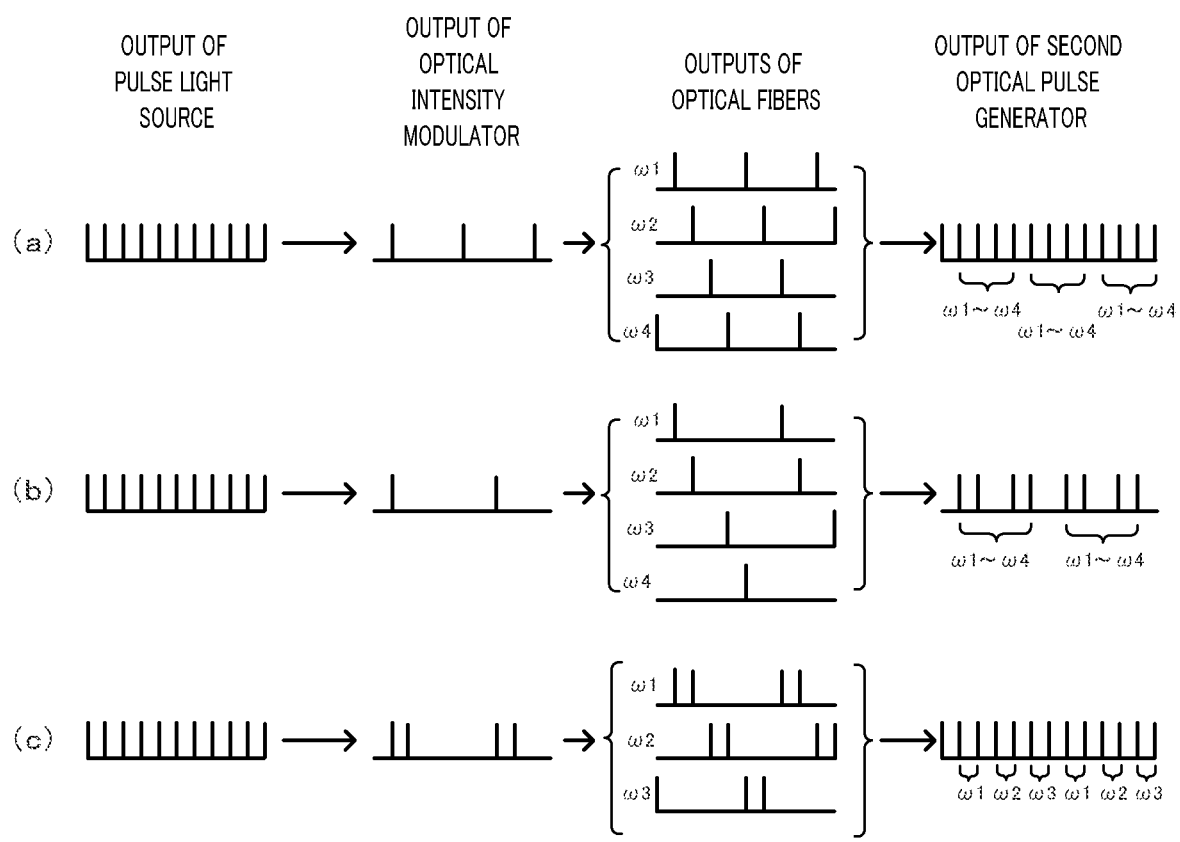
FIG. 2 shows diagrams illustrating a plurality of examples of sequentially outputting optical pulses of M different frequencies at the second repetition frequency by the second optical pulse generator.

The following describes second optical pulses generated by the second optical pulse generator 30. FIG. 2 shows diagrams illustrating a plurality of examples of sequentially outputting optical pulses of M different frequencies at the second repetition frequency by the second optical pulse generator 30. FIG. 2(a) illustrates sequentially outputting optical pulses of four different optical frequencies ω1 to ω4, at the second repetition frequency. FIG. 2(b) illustrates sequentially outputting optical pulses of an optical pulse train including optical pulses of zero output in addition to the optical pulses of four different optical frequencies ω1 to ω4, at the second repetition frequency. FIG. 2(c) illustrates sequentially outputting optical pulses of three different optical frequencies ω1 to ω3 in twos, at the second repetition frequency.

In FIG. 2(a), the optical intensity modulator 32 modulates the optical pulses that are output at the second repetition frequency from the pulse light source 31, such that a first optical pulse out of four consecutive optical pulses is output with keeping the intensity unchanged and that second to fourth optical pulses completely disappear. Accordingly, the optical intensity modulator 32 outputs the optical pulses at a repetition frequency that provides the second repetition frequency by quadruplication (shown as the output of optical intensity modulator in FIG. 2(a)). These optical pulses are dispersed by the diffraction grating 33, and only optical pulses of four different optical frequencies ω1 to ω4 are input into the pulse output time adjuster 34. The lengths of four optical fibers which the optical pulses of the four different optical frequencies ω1 to ω4 respectively enter are adjusted such that the four optical pulses of the optical frequencies ω1 to ω4 are sequentially output at the second repetition frequency. Accordingly, optical pulses having a repetition frequency that provides the second repetition frequency by quadruplication are output from the four optical fibers at frequencies shifted from the second repetition frequency by one cycle each (shown as the outputs of optical fibers in FIG. 2(a)). The optical pulses of the four different optical frequencies ω1 to ω4 output from the four optical fibers are coupled by the diffraction grating 35, and the optical pulses of the four different optical frequencies ω1 to ω4 are sequentially output at the second repetition frequency (shown as the output of second optical pulse generator in FIG. 2(a)). The second optical pulses output from the second optical pulse generator 30 are accordingly four optical pulses (optical pulse of the optical frequency ω1, optical pulse of the optical frequency ω2, optical pulse of the optical frequency ω3, and optical pulse of the optical frequency ω4) that are sequentially output at the second repetition frequency. The foregoing describes the example of sequentially outputting the optical pulses of the four different optical frequencies ω1 to ω4. The same applies to sequentially outputting optical pulses of M different optical frequencies ω1 to ωM.

In FIG. 2(b), the optical intensity modulator 32 modulates the optical pulses that are output at the second repetition frequency from the pulse light source 31, such that a first optical pulse out of six consecutive optical pulses is output with keeping the intensity unchanged and that second to sixth optical pulses completely disappear. Accordingly, the optical intensity modulator 32 outputs the optical pulses at a repetition frequency that provides the second repetition frequency by sextuplication (shown as the output of optical intensity modulator in FIG. 2(b)). These optical pulses are dispersed by the diffraction grating 33, and only optical pulses of four different optical frequencies ω1 to ω4 are input into the pulse output time adjuster 34. The lengths of four optical fibers which the optical pulses of the four different optical frequencies ω1 to ω4 respectively enter are adjusted, such that six optical pulses, i.e., optical pulse of the optical frequency ω1, optical pulse of the optical frequency ω2, optical pulse of zero output, optical pulse of the optical frequency ω3, optical pulse of the optical frequency ω4 and optical pulse of zero output, are output in this sequence at the second repetition frequency. Accordingly, optical pulses including optical pulses of zero output and having a repetition frequency that provides the second repetition frequency by sextuplication are output from the four optical fibers at frequencies shifted from the second repetition frequency by one cycle each (shown as the outputs of optical fibers in FIG. 2(b)). The optical pulses of the four different optical frequencies ω1 to ω4 output from the four optical fibers are coupled by the diffraction grating 35, and an optical pulse train including the optical pulses of zero output in addition to the optical pulses of the four different optical frequencies ω1 to ω4 are sequentially output at the second repetition frequency (shown as the output of second optical pulse generator in FIG. 2(b)). The second optical pulses output from the second optical pulse generator 30 are accordingly six optical pulses (optical pulse of the optical frequency ω1, optical pulse of the optical frequency ω2, optical pulse of zero output, optical pulse of the optical frequency ω3, optical pulse of the optical frequency ω4, and optical pulse of zero output) that are sequentially output at the second repetition frequency. The foregoing describes the example of outputting the optical pulse train including two optical pulses of zero output in addition to the optical pulses of the four different optical frequencies ω1 to ω4. The same applies to outputting an optical pulse train including N optical pulses of zero output added at arbitrary positions to optical pulses of M different optical frequencies ω1 to ωM.

In FIG. 2(c), the optical intensity modulator 32 modulates the optical pulses that are output at the second repetition frequency from the pulse light source 31, such that first and second optical pulses out of six consecutive optical pulses are output with keeping the intensities unchanged and that third to sixth optical pulses completely disappear. Accordingly, the optical intensity modulator 32 outputs the optical pulses in twos at a repetition frequency that provides the second repetition frequency by sextuplication (shown as the output of optical intensity modulator in FIG. 2(c)). These optical pulses are dispersed by the diffraction grating 33, and only optical pulses of three different optical frequencies ω1 to ω3 are input into the pulse output time adjuster 34. The lengths of three optical fibers which the optical pulses of the three different optical frequencies ω1 to ω3 respectively enter are adjusted such that optical pulses of the three different optical frequencies ω1 to ω3 are sequentially output in twos at the second repetition frequency. Accordingly, optical pulses having a repetition frequency that provides the second repetition frequency by sextuplication are output in twos from the three optical fibers at frequencies shifted from the second repetition frequency by two cycles each (shown as the outputs of optical fibers in FIG. 2(c)). The optical pulses of the optical frequencies ω1 to ω3 output in twos from the three optical fibers are coupled by the diffraction grating 35, and the six optical pulses of the optical frequencies ω1 to ω3 are sequentially output in twos at the second repetition frequency (shown as the output of second optical pulse generator in FIG. 2(c)). The second optical pulses output from the second optical pulse generator 30 are accordingly six optical pulses of the optical frequencies ω1 to ω3 (two optical pulses of the optical frequency ω1, two optical pulses of the optical frequency ω2 and two optical pulses of the optical frequency ω3) that are sequentially output in twos at the second repetition frequency.

Figure 3:
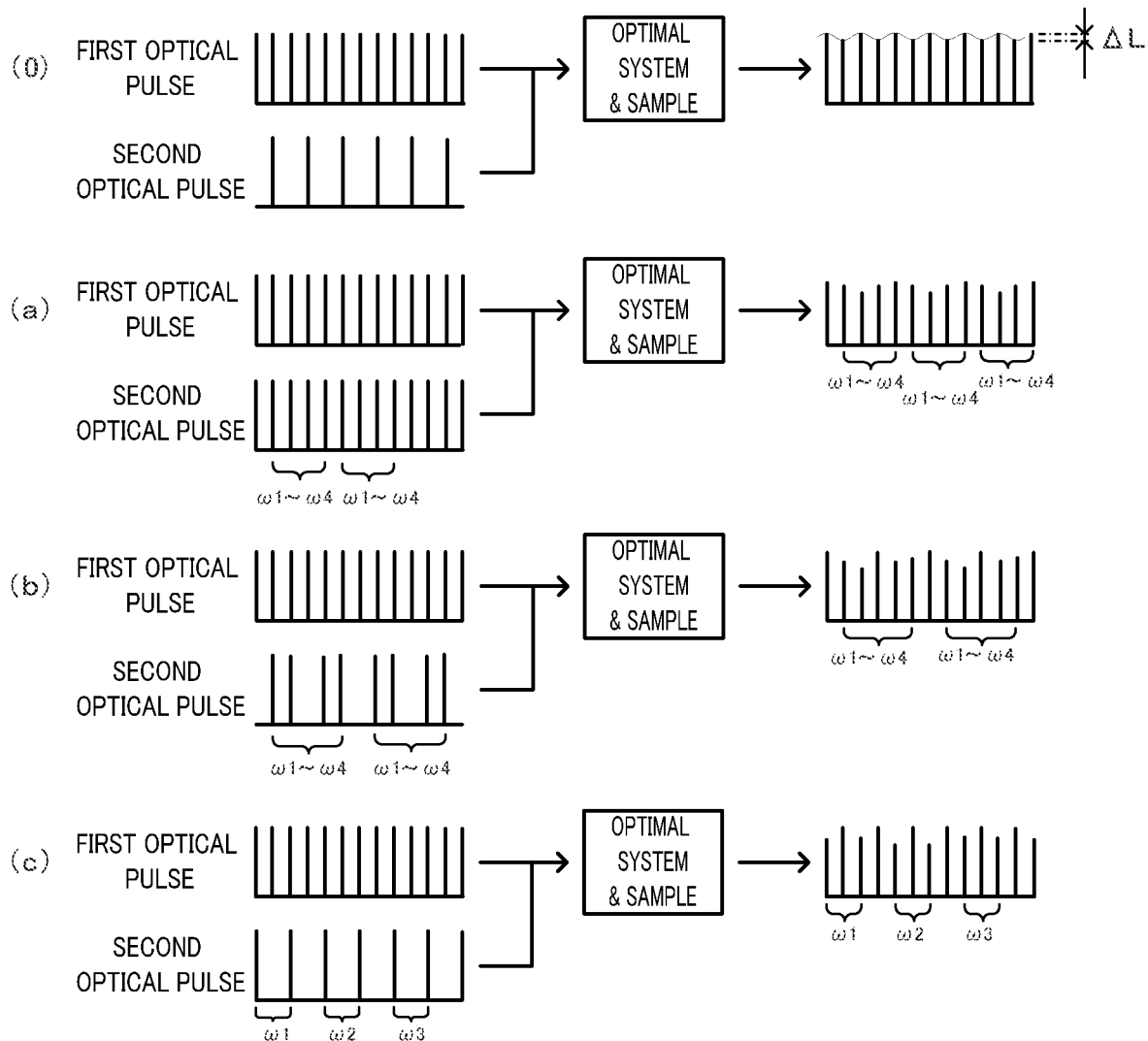
FIG. 3 shows diagrams illustrating attenuation by stimulated Raman scattering that occurs in first optical pulses of transmitted light or scattered light when the sample is irradiated with the first optical pulses and second optical pulses in synchronism with each other.

FIG. 3 shows diagrams illustrating attenuation by stimulated Raman scattering that occurs in first optical pulses of transmitted light or scattered light when the sample 48 is irradiated with the first optical pulses and second optical pulses in synchronism with each other. FIG. 3(0) illustrates attenuation by stimulated Raman scattering when optical pulses of an optical frequency ω are output from the second optical pulse generator 30 at a repetition frequency that provides the first repetition frequency by doubling. FIG. 3(a) illustrates attenuation by stimulated Raman scattering when the optical pulses of FIG. 2(a) are output as second optical pulses from the second optical pulse generator 30 at a repetition frequency identical with the first repetition frequency. FIG. 3(b) illustrates attenuation by stimulated Raman scattering when the optical pulses of FIG. 2(b) are output as second optical pulses from the second optical pulse generator 30 at a repetition frequency identical with the first repetition frequency. FIG. 3(c) illustrates attenuation by stimulated Raman scattering when the optical pulses of FIG. 2(c) are output as second optical pulses from the second optical pulse generator 30 at a repetition frequency that provides the first repetition frequency by doubling.

In FIG. 3(0), the optical pulses of the optical frequency ω are output from the second optical pulse generator 30 at the repetition frequency that provides the first repetition frequency by doubling. The first optical pulses of transmitted light or the scattered light from the sample 48 with output of the second optical pulses in synchronization are subjected to attenuation by stimulated Raman scattering. The first optical pulses without output of the second optical pulses in synchronization are, on the other hand, not subjected to attenuation by stimulated Raman scattering. Accordingly, both the non-attenuated first optical pulses and the attenuated first optical pulses are detected (as shown on the right side in FIG. 3(0)).

In FIG. 3(a), the optical pulses of FIG. 2(a) are repeatedly output from the second optical pulse generator 30 at the repetition frequency identical with the first repetition frequency. More specifically, the four optical pulses (optical pulse of the optical frequency ω1, optical pulse of the optical frequency ω2, optical pulse of the optical frequency ω3, and optical pulse of the optical frequency ω4) are output at the first repetition frequency. Four first optical pulses output in synchronism with the optical pulses of the four different optical frequencies ω1 to ω4 of the transmitted light or the scattered light from the sample 48 are subjected to first to fourth amounts of attenuation by stimulated Raman scattering with the optical pulses of the optical frequencies ω1 to ω4. Accordingly, the first optical pulses having the first to the fourth amounts of attenuation are detected repeatedly (as shown on the right side in FIG. 3(a)).

In FIG. 3(b), the optical pulses of FIG. 2(b) are repeatedly output from the second optical pulse generator 30 at the repetition frequency identical with the first repetition frequency. More specifically, the six optical pulses (optical pulse of the optical frequency ω1, optical pulse of the optical frequency ω2, optical pulse of zero output, optical pulse of the optical frequency ω3, optical pulse of the optical frequency ω4, and optical pulse of zero output) are output at the first repetition frequency. Four first optical pulses output in synchronism with the optical pulses of the four different optical frequencies ω1 to ω4 of the transmitted light or the scattered light from the sample 48 are subjected to first to fourth amounts of attenuation by stimulated Raman scattering with the optical pulses of the optical frequencies ω1 to ω4. Two first optical pulses output in synchronism with the two optical pulses of zero output are not subjected to attenuation by stimulated Raman scattering. Accordingly, an optical pulse train including the two non-attenuated first optical pulses in addition to the four first optical pulses having the first to the fourth amounts of attenuation is detected repeatedly (as shown on the right side in FIG. 3(b)).

In FIG. 3(c), six optical pulses of the optical frequencies ω1 to ω3 are repeatedly output in twos from the second optical pulse generator 30 at the repetition frequency that provides the first repetition frequency by doubling. Six first optical pulses output in synchronism with the optical pulses of the three different optical frequencies ω1 to ω3 in twos of the transmitted light or the scattered light from the sample 48 are subjected to first to third amounts of attenuation by stimulated Raman scattering with the optical pulses of the optical frequencies ω1 to ω3. Accordingly, the first optical pulses having the first to the third amounts of attenuation are detected in twos repeatedly (as shown on the right side in FIG. 3(c)).

Figure 4:
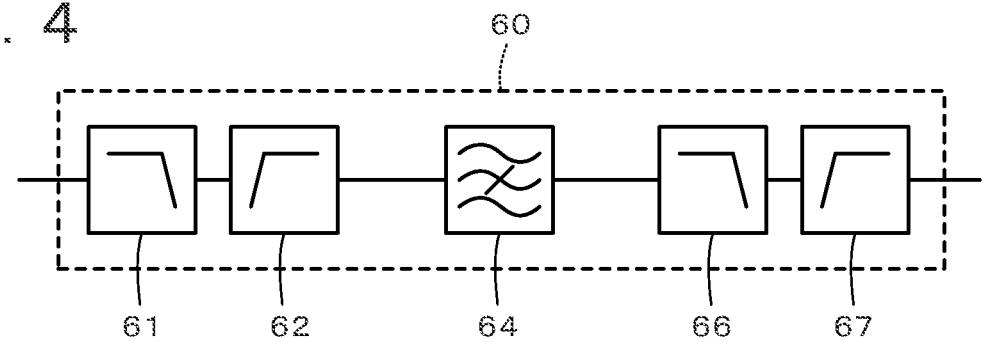
FIG. 4 is a configuration diagram illustrating the schematic configuration of the filter processor.
Figure 5:
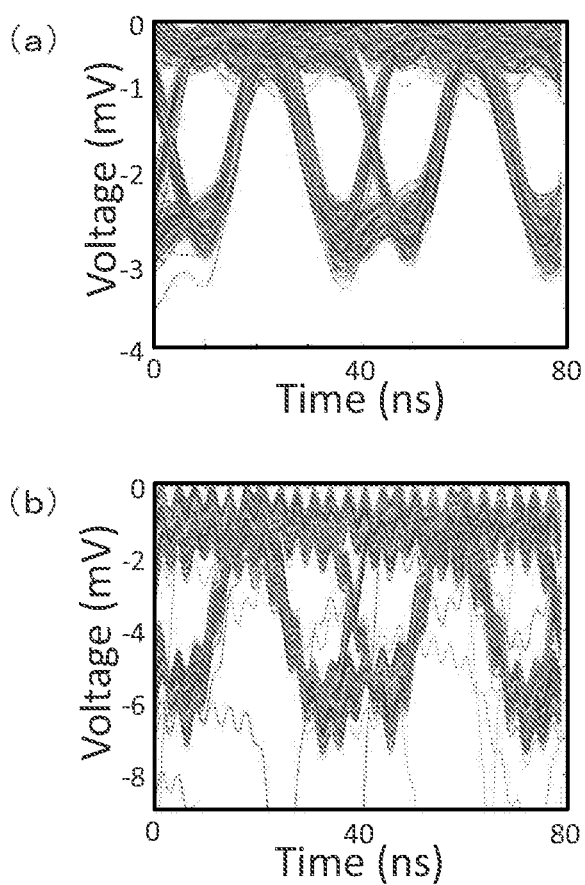
FIG. 5 shows graphs showing signal waveforms subjected to the filtering process by the filter processor of the embodiment and subjected to a filtering process of a comparative example.

An amount of attenuation ΔL of the first optical pulses by stimulated Raman scattering (shown on the right side in FIG. 3(0)) is about 1/10000 to 1/2000 of the intensity of the non-attenuated first optical pulses. Accordingly, the stimulated Raman scattering microscope device 20 causes the filter processor 60 to perform a filtering process, with a view to detecting the waveform of the attenuation by stimulated Raman scattering with high accuracy. FIG. 4 is a configuration diagram illustrating the schematic configuration of the filter processor 60. The filter processor 60 includes a low-pass filter 61 configured to have a cutoff frequency equal to a frequency of ½ of the second repetition frequency, a high-pass filter 62 configured to have a cutoff frequency equal to a frequency of ⅕ to 1/10 of the second repetition frequency, a notch filter 64 configured to remove the first repetition frequency and its two-fold and three-fold frequencies, a low-pass filter 66 identical with the low-pass filter 61, and a high-pass filter 67 identical with the high-pass filter 62, which are arranged in this sequence from the input side. Assuming that the first repetition frequency is 76 MHz and the second repetition frequency is 38 MHz, the low-pass filters 61 and 66 preferably have the cutoff frequencies of 19 MHz, the high-pass filters 62 and 67 preferably have the cutoff frequencies of 5 MHz, and the notch filter 64 is preferably configured to remove the frequencies of 76 MHz, 152 MHz and 228 MHz. FIG. 5 illustrates graphs showing signal waveforms subjected to the filtering process by the filter processor 60 of the embodiment and subjected to a filtering process of a comparative example. FIG. 5(a) is a graph showing a signal waveform subjected to the filtering process by the filter processor 60 of the embodiment. FIG. 5(b) is a graph showing a signal waveform subjected to the filtering process of the comparative example. Filters used in the comparative example include a bandpass filter of 1 MHz to 25 MHz in place of the low-pass filter 61 and the high-pass filter 62, and another bandpass filter of 1 MHz to 25 MHz in place of the low-pass filter 66 and the high-pass filter 67. The graphs show that the signal waveform of the embodiment has little disturbance, while the signal waveform of the embodiment has significant disturbance.

The digital measurement unit 70 is configured as a known AD converter to digitize the signals subjected to the filtering process by the filter processor 60 in a predetermined sampling frequency, for example, in a two-fold or four-fold frequency of the first repetition frequency.

In the stimulated Raman scattering microscope device 20 of the embodiment described above, the sample 48 is irradiated with the second optical pulses of the M different optical frequencies sequentially changing at the second repetition frequency in synchronism with the first optical pulses. This causes M different amounts of attenuation of the first optical pulses by stimulated Raman scattering with the second optical pulses of the M different optical frequencies. This configuration needs only irradiation of one irradiation point with M optical pulses and thereby allows for quicker scanning, compared with a configuration that changes the optical frequency by every fractional frequency. It is preferable herein that the number of the M different optical frequencies is a required number of different types of molecules for identification of an object among molecules contained in the object included in the sample.

The stimulated Raman scattering microscope device 20 of the embodiment enables various optical pulse trains, for example, an optical pulse train including optical pulses of M different optical frequencies sequentially changed in plural numbers at the second repetition frequency or an optical pulse train including optical pulses of zero output in addition to optical pulses of M different optical frequencies sequentially changed at the second repetition frequency, to be output as the second optical pulses from the second optical pulse generator 30. This configuration ensures quicker and more reliable detection of an object included in a sample.

The stimulated Raman scattering microscope device 20 of the embodiment irradiates the sample 48 with the second optical pulses of the lower optical frequencies than the optical frequency of the first optical pulses, in synchronism with the first optical pulses and detects attenuation of the first optical pulses by stimulated Raman scattering. One modification may irradiate the sample 48 with second optical pulses of higher optical frequencies than the optical frequency of the first optical pulses, in synchronism with the first optical pulses and detect amplification of the first optical pulses by stimulated Raman scattering.

Figure 6:
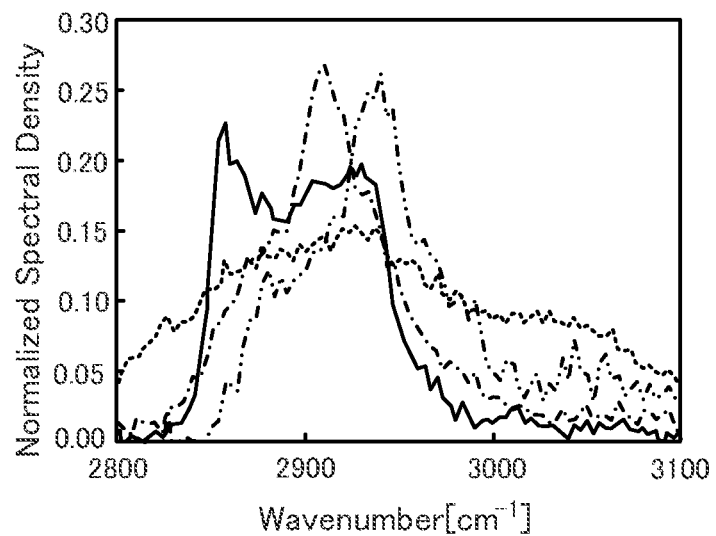
FIG. 6 is a graph showing variations in standardized values of attenuation by stimulated Raman scattering when euglena is irradiated with changing the optical frequency by every fractional frequency.
Figure 7:
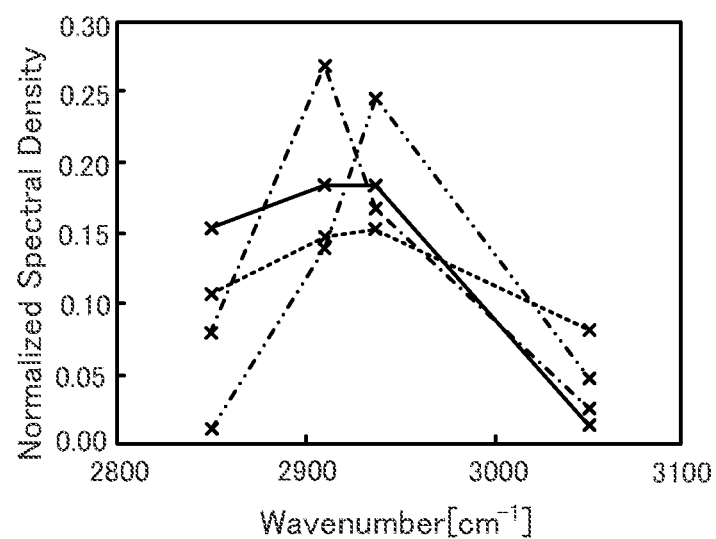
FIG. 7 is a graph showing variations in standardized values of attenuation by stimulated Raman scattering when euglena is irradiated with sequentially changing four different optical frequencies.

FIG. 6 illustrates graphs of stimulated Raman scattering spectra when euglena is irradiated with changing the optical frequency by every fractional frequency. FIG. 7 illustrates graphs of values of euglena at four different optical frequencies by stimulated Raman scattering respectively connected by straight lines. In these drawings, solid line graphs indicate stimulated Raman scattering spectra of lipid. Broken line graphs indicate spectra of chloroplast. One-dot chain line graphs indicate spectra of paramylon. Two-dot chain line graphs indicate spectra of protein and DNA. As understood by comparison between the graphs of FIG. 6 and the graphs of FIG. 7, the shapes of the graphs of FIG. 7 have similar tendencies to those of the spectra of FIG. 6. This indicates that the components of euglena as an object included in a sample can be identified by using the second optical pulses with sequentially changing four different optical frequencies. The euglena included in the sample can thus be quickly detected by scanning the sample 48 with the second optical pulses of the four different optical pulses for identification of euglena sequentially changed at the second repetition frequency, in synchronism with the first optical pulses.

FIGS. 6 and 7 illustrate a concrete example of euglena as the object. The object may, however, be any of various objects other than euglena, for example, any of various cells such as blood cells.

Figure 8:
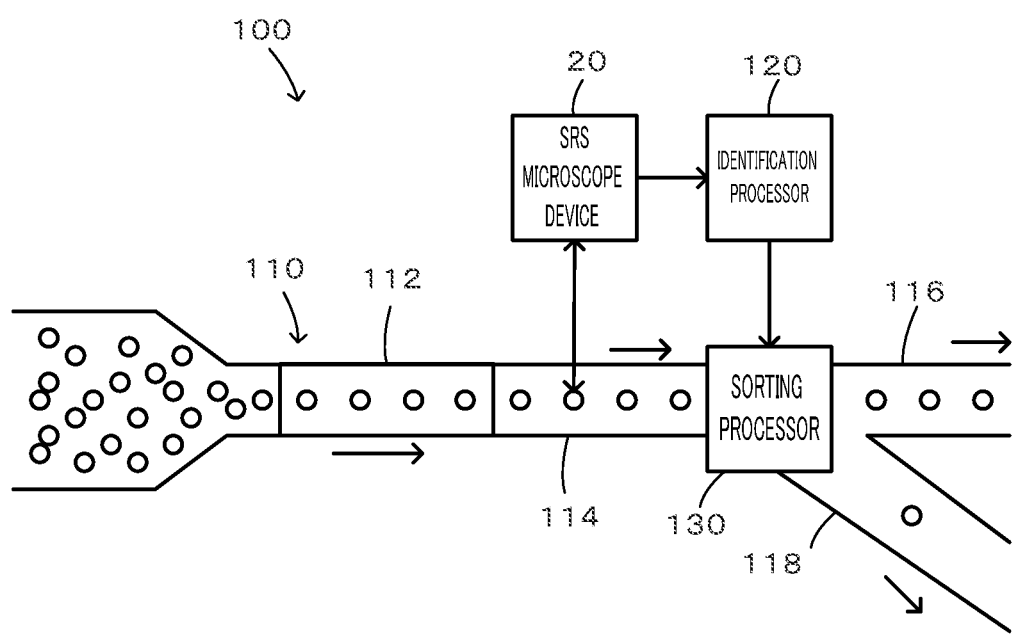
FIG. 8 is a configuration diagram illustrating the schematic configuration of a cell sorting system using the stimulated Raman scattering microscope device of the embodiment.

FIG. 8 is a configuration diagram illustrating the schematic configuration of a cell sorting system 100 using the stimulated Raman scattering microscope device 20 of the embodiment. The cell sorting system 100 includes a cell sorting flow path device 110 configured to flow a liquid containing multiple different types of cells (cells-containing liquid), the stimulated Raman scattering microscope device 20 of the embodiment, an identification processor 120 configured to identify a target cell using a detection signal from the stimulated Raman scattering microscope device 20, and a sorting processor 130 configured to sort out the target cells to a branch flow path 118 of the cell sorting flow path device 110. The cell sorting flow path device 110 is made of a material that is not eroded by the cells-containing liquid (for example, an epoxy resin) and may be configured to include an alignment flow path 112 that causes the cells included in the cells-containing liquid to flow in a line, a detection flow path 114 that causes the cells included in the cells-containing liquid to be detected by the stimulated Raman scattering microscope device 20, and a main flow path 116 and the branch flow path 118 that cause the target cells to be sorted out from the flow of the cells-containing liquid, which are arranged sequentially from the upstream side. The identification processor 120 may be configured by a general-purpose computer with a processing program installed therein to perform image matching and determine whether an image of the cells by stimulated Raman scattering formed by a detection signal, which is obtained by scanning with the stimulated Raman scattering microscope device 20, matches with an image of the target cells by stimulated Raman scattering. The sorting processor 130 may be configured to cause cavitation by pulse laser and press out the target cells into the branch flow path 118 by the force of expansion. In this cell sorting system 100, the stimulated Raman scattering microscope device 20 scans a sample using an optical pulse train including optical pulses of multiple different optical frequencies required for identification of the target cell as the second optical pulses or irradiates the sample with the optical pulse train in a line, and detects attenuation of the first optical pulses occurring at different positions in the samples by using a plurality of photodiodes. This enables the target cells to be sorted out at the higher speed and with the higher accuracy.

FIG. 8 illustrates a concrete example of incorporating the stimulated Raman scattering microscope device 20 of the embodiment in the cell sorting system 100. The stimulated Raman scattering microscope device 20 of the embodiment may serve as a stand-alone device or may be incorporated in an apparatus configured to observe blood cells by endoscopy.

Figure 9:
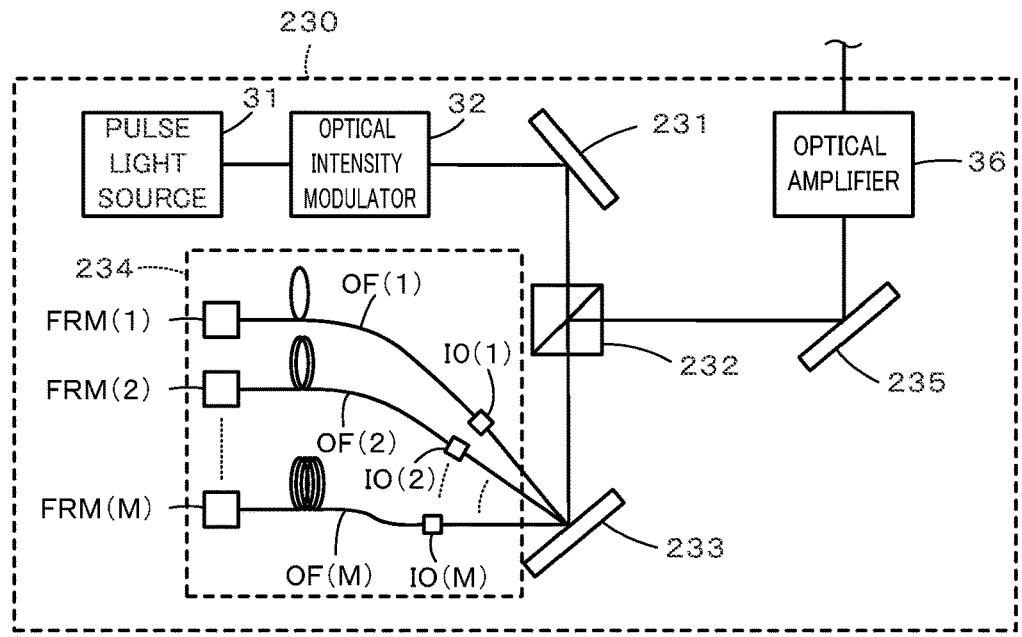
FIG. 9 is a configuration diagram illustrating the schematic configuration of a second optical pulse generator according to a modification.

In the stimulated Raman scattering microscope device 20 of the embodiment, the second optical pulse generator 30 is configured by the pulse light source 31, the optical intensity modulator 32, the diffraction grating 33, the pulse output time adjuster 34, the diffraction grating 35 and the optical amplifier 36. According to a modification shown in FIG. 9, a second optical pulse generator 230 may be configured by a pulse light source 31, an optical intensity modulator 32, a mirror 231, a polarizing beam splitter 232, a diffraction grating 233, a pulse output time adjuster 234, a mirror 235, and an optical amplifier 36.

The polarizing beam splitter 232 is an optical element configured to separate lights of different polarizations by 90 degrees from each other (S polarized light and P polarized light) and may, for example, transmit the light of S polarization and reflect the light of P polarization. The pulse output time adjuster 234 is comprised of M optical fibers OF(1) to OF(M) that cause optical pulses of predetermined M different optical frequencies among optical pulses dispersed by the diffraction grating 233 to be received by light receiving/output portions IO(1) to IO(M) and to be output to FRM(1) to FRM(M), while causing optical pulses reflected by FRM(1) to FRM(M) to be output to the light receiving/output portions IO(1) to IO(M). Each of FRM(1) to FRM(M) is a Faraday rotator mirror that polarization-rotates and reflects the light entering from each optical fiber by 90 degrees by means of a Faraday rotator and a reflection mirror. The lengths of the optical fibers OF(1) to OF(M) are adjusted such that optical pulses of M different frequencies simultaneously input into the light receiving/output portions IO(1) to IO(M) are reflected by FRM(1) to FRM(M) and are sequentially output from the light receiving/output portions IO(1) to IO(M) at the second repetition frequency.

The second optical pulse generator 230 of the modification generates second optical pulses like the second optical pulse generator 30 of the embodiment. For example, in the case of the second optical pulses of FIG. 2(*a*), like the above embodiment, in the second optical pulse generator 230 of the modification, the optical intensity modulator 32 modulates the optical pulses that are output at the second repetition frequency from the pulse light source 31, such that a first optical pulse out of four consecutive optical pulses is output with keeping the intensity unchanged and that second to fourth optical pulses completely disappear. Accordingly, the optical intensity modulator 32 outputs the optical pulses at a repetition frequency that provides the second repetition frequency by quadruplication. Only components of a predetermined polarization (for example, S polarization) out of these optical pulses are transmitted through the polarizing beam splitter 232 and are dispersed by the diffraction grating 233. Only optical pulses of four different optical frequencies $\omega 1$ to $\omega 4$ are input into the pulse output time adjuster 234. The optical pulses of the four different optical frequencies $\omega 1$ to $\omega 4$ are guided by optical fibers OF(1) to OF(4) to FRM(1) to FRM(4) and are reflected by FRM(1) to FRM(4) such as to rotate the polarization by 90 degrees. The four optical pulses reflected by FRM(1) to FRM(4) are coupled by the diffraction grating 233 via the optical fibers OF(1) to OF(4). The lengths of the optical fibers OF(1) to OF(4) are adjusted such that the four optical pulses of the optical frequencies $\omega 1$ to $\omega 4$ are sequentially output at the second repetition frequency by reciprocating motions of the optical pulses. Accordingly, optical pulses having a repetition frequency that provides the second repetition frequency by quadruplication are output from the four optical fibers OF(1) to OF(4) at frequencies shifted from the second repetition frequency by one cycle each. Coupling these optical pulses by the diffraction grating 233 provides a pulse train of the four optical pulses of the optical frequencies $\omega 1$ to $\omega 4$ that are sequentially output at the second repetition frequency. The four optical pulses of the optical frequencies $\omega 1$ to $\omega 4$ are reflected by FRM(1) to FRM(4) to rotate the polarization by 90 degrees, are reflected toward the mirror 235 by the polarizing beam splitter 232, and are output via the mirror 235 and the optical intensity amplifier 36. The same applies to generation of the second optical pulses in the case of FIG. 2(*b*) and in the case of FIG. 2(*c*).

Figure 10:
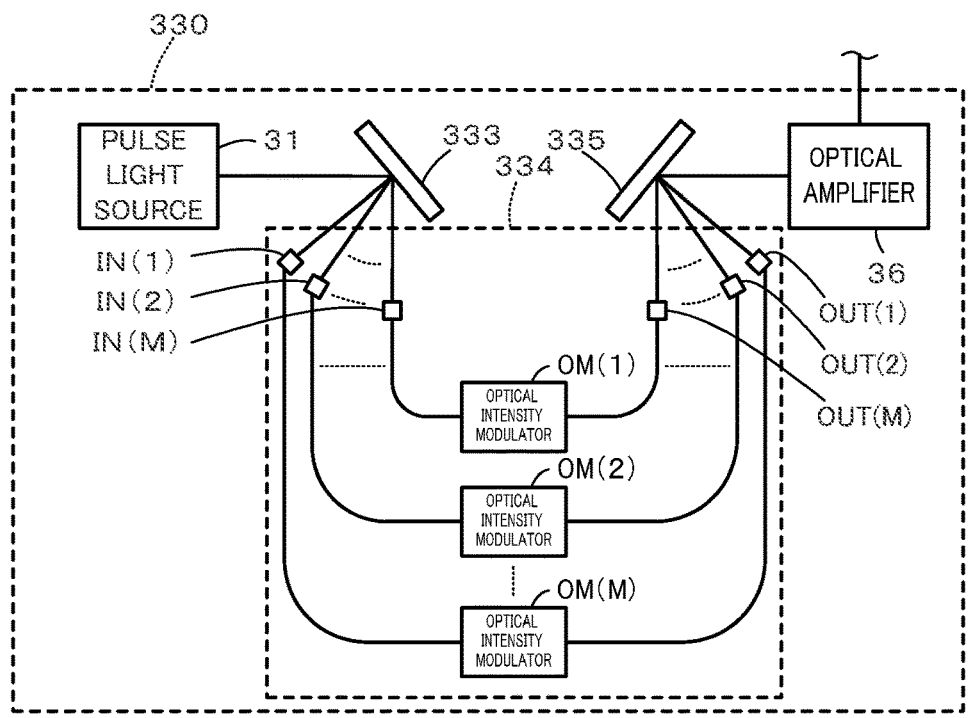
FIG. 10 is a configuration diagram illustrating the schematic configuration of a second optical pulse generator according to another modification.

According to another modification shown in FIG. 10, a second optical pulse generator 330 may be configured by a pulse light source 31, a diffraction grating 333, a pulse output time adjuster 334, a diffraction grating 335, and an optical amplifier 36. The pulse output time adjuster 334 includes light receiving portions IN(1) to IN(M) configured to receive optical pulses of predetermined M different optical frequencies among optical pulses dispersed by the diffraction grating 333; M optical intensity modulators OM(1) to OM(M) configured to modulate the optical pulses of the M different optical frequencies from the light receiving portions IN(1) to IN(M) such that optical pulses are periodically output with keeping their intensities unchanged or completely disappear, and accordingly provide M optical pulse trains of the optical pulses of the M different optical frequencies; and M output portions OUT(1) to OUT(M) configured to output the M optical pulse trains from the M optical intensity modulators OM(1) to OM(M) to the diffraction grating 335.

Figure 11:
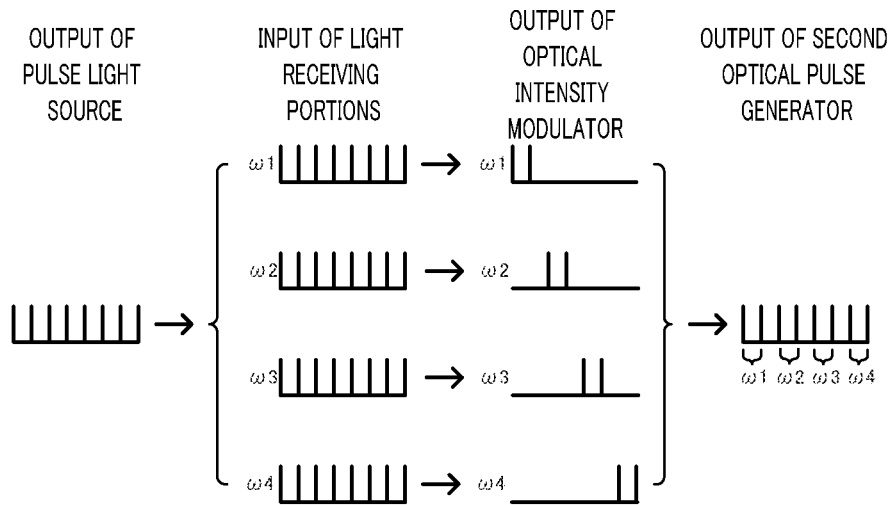
FIG. 11 is a diagram illustrating one example of generating second optical pulses by the second optical pulse generator according to the modification.

The second optical pulse generator 330 of the modification generates various second optical pulses in the pattern of the M optical pulse trains that are generated by the M optical intensity modulators OM(1) to OM(M) such that optical pulses are output with keeping their intensities unchanged or completely disappear. FIG. 11 is a diagram illustrating one example of generating second optical pulses by the second optical pulse generator 330 of the modification. FIG. 11 illustrates an example of generating an optical pulse train of a total of eight optical pulses by arranging optical pulses of four different optical frequencies in twos as the second optical pulses. An optical pulse train of eight optical pulses output from the pulse light source 31 is dispersed by the diffraction grating 333. Four optical pulse trains respectively including eight optical pulses of four different optical frequencies $\omega 1$ to $\omega 4$ are input into light receiving portions IN(1) to IN(4). The optical pulse trains of the four different optical frequencies ω1 to ω4 are then respectively modulated by optical intensity modulators OM(1) to OM(4) as follows. With regard to the optical pulse train of the frequency ω1, two optical pulses, i.e., first and second optical pulses are output with keeping their intensities unchanged, and the remaining six optical pulses completely disappear. With regard to the optical pulse train of the frequency ω2, two optical pulses, i.e., third and fourth optical pulses are output with keeping their intensities unchanged, and the remaining six optical pulses completely disappear. With regard to the optical pulse train of the frequency ω3, two optical pulses, i.e., fifth and sixth optical pulses are output with keeping their intensities unchanged, and the remaining six optical pulses completely disappear. With regard to the optical pulse train of the frequency ω4, two optical pulses, i.e., seventh and eighth optical pulses are output with keeping their intensities unchanged, and the remaining six optical pulses completely disappear. Accordingly, four optical pulse trains of eight optical pulses are provided to respectively include two optical pulses of the four different optical frequencies ω1 to ω4 and disappearing six pulses. The four optical pulse trains of the optical frequencies ω1 to ω4 are output from the output portions OUT(1) to OUT(M), are coupled by the diffraction grating 335, and have the intensities amplified by the optical amplifier 36. The second optical pulse generator 330 accordingly outputs the second optical pulses, which are arranged sequentially, as an optical pulse train of eight optical pulses including two optical pulses of the frequency ω1, two optical pulses of the frequency ω2, two optical pulses of the frequency ω3 and two optical pulses of the frequency ω4.

As understood from the foregoing description, the second optical pulse generator 330 of the modification changes the pattern of disappearance of optical pulse trains by the M optical intensity modulators OM(1) to OM(M) and thereby generates various optical pulse trains respectively including optical pulses of M different optical frequencies, as the second optical pulses.

Figure 12:
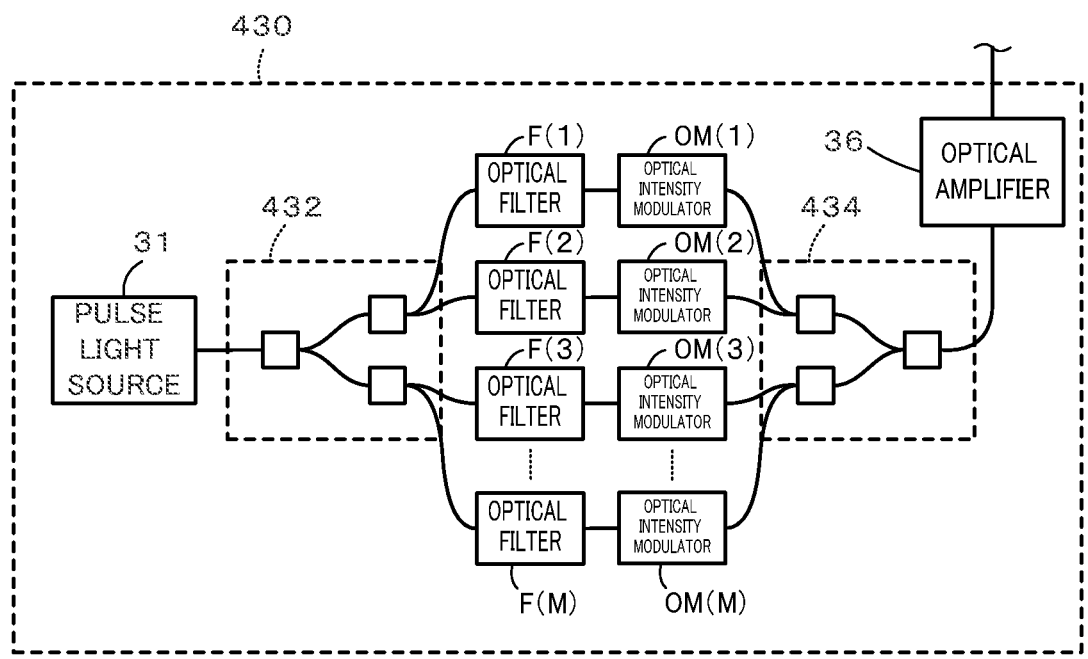
FIG. 12 is a configuration diagram illustrating the schematic configuration of a second optical pulse generator according to another modification.

According to another modification shown in FIG. 12, a second optical pulse generator 430 may be configured by a pulse light source 31; an optical splitter 432 configured to disperse optical pulses from the pulse light source 31 into M optical pulses; M optical filters F(1) to F(M) configured to provide optical pulses of M different frequencies from the M optical pulses; M optical intensity modulators OM(1) to OM(M) configured to modulate the optical pulses such that optical pulses are periodically output with keeping their intensities unchanged or completely disappear; a coupler 434 configured to couple M optical pulses; and an optical amplifier 36. The optical splitter 432 may be configured by, for example, a plurality of beam splitters.

Figure 13:
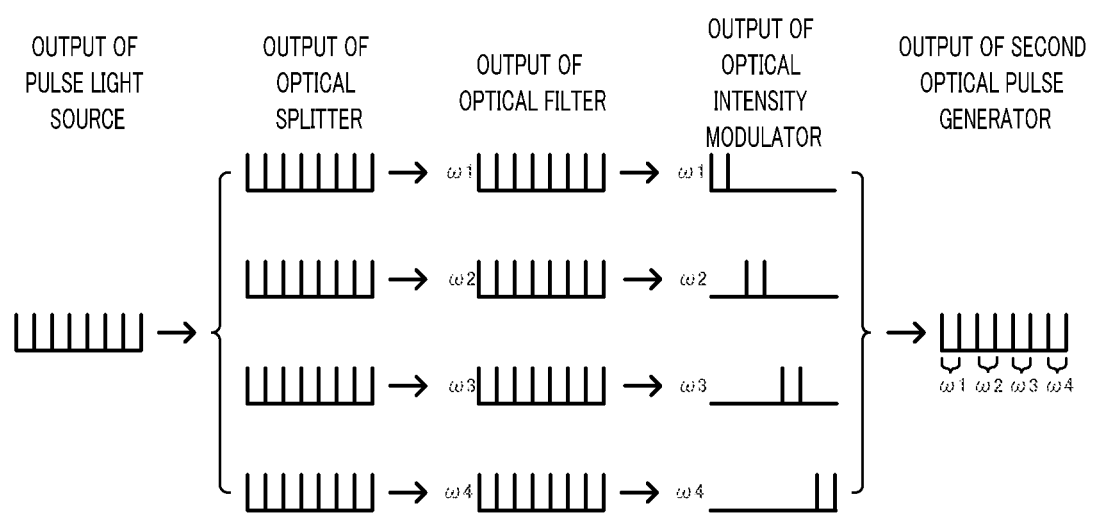
FIG. 13 is a diagram illustrating one example of generating second optical pulses by the second optical pulse generator according to the modification.

The following describes generation of second optical pulses by the second optical pulse generator 430 of the modification. FIG. 13 is a diagram illustrating generation of an optical pulse train including respective pairs of two optical pulses of four different frequencies as the second optical pulses by the second optical pulse generator 430 of the modification. In the illustrated example, an optical pulse train consisting of eight optical pulses from the pulse light source 31 is dispersed into four optical pulse trains by the optical splitter 432. Four optical pulse trains of frequencies ω1 to ω4 are provided by optical filters F(1) to F(4) and are then respectively modulated by optical intensity modulators OM(1) to OM(4) as follows. With regard to the optical pulse train of the frequency ω1, two optical pulses, i.e., first and second optical pulses are output with keeping their intensi-ties unchanged, and the remaining six optical pulses completely disappear. With regard to the optical pulse train of the frequency ω2, two optical pulses, i.e., third and fourth optical pulses are output with keeping their intensities unchanged, and the remaining six optical pulses completely disappear. With regard to the optical pulse train of the frequency ω3, two optical pulses, i.e., fifth and sixth optical pulses are output with keeping their intensities unchanged, and the remaining six optical pulses completely disappear. With regard to the optical pulse train of the frequency ω4, two optical pulses, i.e., seventh and eighth optical pulses are output with keeping their intensities unchanged, and the remaining six optical pulses completely disappear. The optical pulse trains are then coupled by the coupler 434 and have the intensities amplified by the optical amplifier 36. The second optical pulse generator 430 accordingly outputs the second optical pulses, which are arranged sequentially, as an optical pulse train of eight optical pulses including two optical pulses of the frequency ω1, two optical pulses of the frequency ω2, two optical pulses of the frequency ω3 and two optical pulses of the frequency ω4.

The second optical pulse generator 430 of the modification outputs an optical pulse train including respective pairs of two consecutive optical pulses of different frequencies are arranged sequentially, as the second optical pulses. Various optical pulse trains including optical pulses of M different optical frequencies may be generated as the second optical pulses by changing the pattern of disappearance of optical pulses in the optical pulse trains by the M optical intensity modulators OM(1) to OM(M).

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the stimulated Raman scattering microscope device and so on.

The invention claimed is:

1. A stimulated Raman scattering microscope device, comprising:
    a first light pulse generator configured to output a first light pulse of a predetermined light frequency at a first repetition frequency;
    a second light pulse generator configured to output a second light pulse of a light frequency different from the predetermined light frequency of the first light pulse at a second repetition frequency that provides the first repetition frequency by integral multiplication; and
    a light intensity detector configured to detect light intensity of light pulses of the predetermined light frequency at the first repetition frequency that are included in transmitted light and/or scattering light from a sample irradiated with the first light pulse in synchronism with the second light pulse, wherein
    the second light pulse generator comprises
        a light source unit configured to output predetermined light pulses including optical pulses of broadband light;
        a light splitting regulator configured to disperse the predetermined light pulses and output light pulses of a predetermined number of different light frequencies out of the dispersed light pulses, at the second repetition frequency, wherein the light splitting regulator includes the predetermined number of optical fibers configured to adjust output times of the light pulses of the predetermined number of different light frequencies; and a light coupler configured to couple the light pulses from the light splitting regulator, so that the coupled light pulses of the predetermined number of the different light frequencies are sequentially output.

2. The stimulated Raman scattering microscope device according to claim 1, wherein the light source unit comprises a light source configured to output the predetermined light pulses at a repetition frequency that provides the second repetition frequency by multiplication of the predetermined number.

3. The stimulated Raman scattering microscope device according to claim 1, wherein the light source unit is a light source unit configured to output a predetermined light pulse train, which includes a predetermined consecutive number of the predetermined light pulses of the second repetition frequency, at a repetition frequency that provides the second repetition frequency by multiplication of the predetermined number by the predetermined consecutive number.

4. The stimulated Raman scattering microscope device according to claim 3, wherein the light source unit comprises:
a light source configured to output the predetermined light pulses at the second repetition frequency; and
a light intensity modulator configured to make intensity of remaining light pulses equal to a value 0, such that the predetermined light pulse train is output at the repetition frequency that provides the second repetition frequency by multiplication of the predetermined number by the predetermined consecutive number, from a light pulse train including the predetermined light pulses of the second repetition frequency from the light source.

5. The stimulated Raman scattering microscope device according to claim 1, wherein the second light pulse generator comprises an intensity amplifier configured to amplify intensity of a light pulse from the light coupler and output the light pulse of the amplified intensity.

6. The stimulated Raman scattering microscope device according to claim 1, further comprising:

a filter processor configured to process a detection signal from the light intensity detector by a low-pass filter that has a cutoff frequency equal to a frequency of ½ of the second repetition frequency, a high-pass filter that has a cutoff frequency equal to a frequency of ⅕ to 1/10 of the second repetition frequency, and a notch filter that has at least the first repetition frequency; and an intensity modulation measurement unit configured to digitize an output from the filter processor at a predetermined sampling period and measure an intensity modulation.

7. The stimulated Raman scattering microscope device according to claim 1, wherein the light splitting regulator outputs, with a time shift, the light pulses of three or more different light frequencies out of the dispersed light pulses, at the second repetition frequency.

8. The stimulated Raman scattering microscope device according to claim 7, wherein the light coupler couples the light pulses from the light splitting regulator and one or more optical pulses of zero output, so that the light pulses of the three or more different light frequencies and the one or more optical pulses of zero output are sequentially output in an optical train.

9. The stimulated Raman scattering microscope device according to claim 7, wherein the light coupler couples the light pulses from the light splitting regulator, so that the light pulses of the three or more different light frequencies are sequentially output in twos in an optical train.

10. A stimulated Raman scattering measurement method comprising:

irradiating a sample with a first light pulse of a predetermined light frequency at a first repetition frequency;

irradiating the sample with a second light pulse of a light frequency different from the predetermined light frequency of the first light pulse at a second repetition frequency that provides the first repetition frequency by integral multiplication, in synchronism with the first light pulse; and detecting light pulses of the predetermined light frequency at the first repetition frequency that are included in transmitted light and/or scattering light from the sample irradiated with the first light pulse and the second light pulse, as a detected light pulse train, wherein the stimulated Raman scattering measurement method further comprises generating the second light pulse by:

dispersing predetermined light pulses that include optical pulses of broadband light;

regulating to output light pulses of a predetermined number of different light frequencies out of the dispersed light pulses, at the second repetition frequency, wherein the regulating is performed at least by the predetermined number of optical fibers configured to adjust output times of the light pulses of the predetermined number of different light frequencies; and coupling the regulated light pulses, so that the coupled light pulses of the predetermined number of the different light frequencies are sequentially output.

* * * * *